US008958376B2

(12) United States Patent
Lindoff et al.

(10) Patent No.: US 8,958,376 B2
(45) Date of Patent: *Feb. 17, 2015

(54) SCHEDULING DATA TRANSMISSIONS BETWEEN A MOBILE TERMINAL AND A BASE STATION IN A WIRELESS COMMUNICATIONS NETWORK (75) Inventors: Bengt Lindoff, Bjärred (SE); Stefan Andersson, Lund (SE); Lars Sundström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 232 days.

This patent is subject to a terminal disclaimer.

(21) Appl. No.: 13/377,165

(22) PCT Filed: Jun. 2, 2010

(86) PCT No.: PCT/EP2010/057714

§ 371 (c)(1),
(2), (4) Date: Jan. 18, 2012

(87) PCT Pub. No.: WO2010/145938

PCT Pub. Date: Dec. 23, 2010

(65) Prior Publication Data

US 2012/0113935 A1    May 10, 2012

Related U.S. Application Data (60) Provisional application No. 61/187,732, filed on Jun. 17, 2009.

(51) Int. Cl.
*H04W 72/12* (2009.01)
*H04W 28/04* (2009.01)
*H04W 72/08* (2009.01)

(52) U.S. Cl.
CPC .......... *H04W 28/04* (2013.01); *H04W 72/1284* (2013.01); *H04W 72/085* (2013.01); *H04W 72/1231* (2013.01)
USPC ...................................... 370/329

(58) Field of Classification Search
CPC ...... H04L 5/001; H04W 28/20; H04W 72/02; H04W 72/048; H04W 72/085; H04W 72/1231; H04W 72/1284; H04W 28/04
USPC .......................................... 370/310, 328, 329
See application file for complete search history.

(56) References Cited

U.S. PATENT DOCUMENTS 6,934,267 B1   8/2005   Mannerstrale
7,206,567 B2   4/2007   Jin et al.
(Continued)

FOREIGN PATENT DOCUMENTS

CN     101287184 A    10/2008
EP     2012445 A2     1/2009
(Continued)

OTHER PUBLICATIONS

3rd Generation Partnership Project. "Initial List of eNB Measurements." 3GPP TSG RAN WG1 #49bis, R1-073156, Orlando, USA, Jun. 25-29, 2007.
(Continued)

*Primary Examiner* — Chi H Pham
*Assistant Examiner* — Robert Lopata
(74) *Attorney, Agent, or Firm* — Coats & Bennett, PLLC (57) ABSTRACT A method of scheduling wireless data transmissions between a mobile terminal and a base station using multiple system carrier signals is disclosed. The method comprises the steps of receiving (101) the mobile terminal information from the base station indicating available system carriers; detecting (102) at least one dynamic parameter indicative of the mobile terminal's current capability to handle non-contiguous system carriers; determining (103) from the dynamic parameter whether a situation has occurred where the mobile terminal's capability to handle non-contiguous system carriers has been reduced; modifying (104), in such case, feedback information to be transmitted to the base station; and transmitting (105) the modified feedback information to the base station. By modifying the feedback information in this way the mobile terminal reduces the likelihood that the base station allocates non-contiguous system carriers to the mobile terminal in situations where it has a reduced capability of handling such system carriers.

15 Claims, 4 Drawing Sheets (56) References Cited

U.S. PATENT DOCUMENTS

| | | | |
|---|---|---|---|
| 8,000,706 | B2 | 8/2011 | Lee et al. |
| 8,422,539 | B2* | 4/2013 | Lai et al. ............ 375/219 |
| 8,514,793 | B2* | 8/2013 | Gauvreau et al. ......... 370/329 |
| 8,520,621 | B2* | 8/2013 | Tee et al. .............. 370/329 |
| 2007/0007090 | A1 | 1/2007 | Doerflinger et al. |
| 2007/0135125 | A1 | 6/2007 | Kim et al. |
| 2008/0310338 | A1 | 12/2008 | Charpenter et al. |
| 2009/0011783 | A1 | 1/2009 | Kitazoe |
| 2009/0093255 | A1 | 4/2009 | Balasubramanian |
| 2009/0279480 | A1 | 11/2009 | Rosenqvist et al. |
| 2010/0272051 | A1* | 10/2010 | Fu et al. ............. 370/329 |
| 2010/0279691 | A1 | 11/2010 | Dwyer et al. |
| 2011/0038271 | A1* | 2/2011 | Shin et al. ............ 370/252 |
| 2011/0075647 | A1 | 3/2011 | Liu et al. |
| 2011/0142009 | A1* | 6/2011 | Lindoff et al. ........... 370/332 |
| 2011/0182201 | A1* | 7/2011 | Pajukoski et al. ......... 370/252 |
| 2012/0021693 | A1* | 1/2012 | Wintzell et al. ........ 455/67.11 |
| 2012/0127905 | A1 | 5/2012 | Lindoff et al. |

FOREIGN PATENT DOCUMENTS

| | | |
|---|---|---|
| GB | 2386507 A | 9/2003 |
| WO | 2006107965 A1 | 10/2006 |
| WO | 2007050687 A2 | 5/2007 |
| WO | 2007133621 A2 | 11/2007 |
| WO | 2008085009 A1 | 7/2008 |
| WO | 2009021012 A2 | 2/2009 |
| WO | 2009106490 A1 | 9/2009 |
| WO | 2009142816 A1 | 11/2009 |
| WO | 2010145933 A1 | 12/2010 |
| WO | 2010145938 A1 | 12/2010 |

OTHER PUBLICATIONS

3rd Generation Partnership Project. "DTX and Carrier Activation/Deactivation for DC-HSUPA." 3GPP TSG-RAN WG2 Meeting #66, R2-093201, San Francisco, USA, May 4-8, 2009.

3rd Generation Partnership Project. "Carrier aggregation in active mode." 3GPP TSG-RAN WG2 Meeting #66, R2-093104, San Francisco, USA, May 4-8, 2009, pp. 1-4.

3rd Generation Partnership Project. "DC-HSDPA and CPC." 3GPP TSG-RAN WG1 #53bis, R1-082294, Warsaw, Poland, Jun. 30-Jul. 4, 2008, pp. 1-3.

3rd Generation Partnership Project. "UE-specific Carrier Assignment for LTE-Advanced." 3GPP TSG RAN WG1 Meeting #57, R1-092126, San Francisco, USA, May 4-8, 2009, pp. 1-3.

3rd Generation Partnership Project. "New UE capability for RRM optimisation." 3GPP TSG RAN WG2 #48, Tdoc R2-051764, London, UK, Aug. 29-Sep. 2, 2005, pp. 1-3.

Wang Y. et al. "Uplink Overheard Analysis and Outage Protection for Multi-Carrier LTE-Advanced Systems." Personal, Indoor and Mobile Radio Communications Symposium 2009, IEEE conference proceedings, Sep. 2009, pp. 1-5.

3rd Generation Partnership Project. "3rd Generation Partnership Project; Technical Specification Group Radio Access Network; Radio Resource Control (RRC); Protocol Specification (Release 4)." 3GPP TS 25.331, V4.20.0, Dec. 2008, pp. 66-74, 103-104.

3rd Generation Partnership Project. "Some Aspects on Carrier Aggregation." 3GPP TSG-RAN2 Meeting #66, R2-093214, San Francisco, USA, May 4-8, 2009, pp. 1-3.

* cited by examiner

SCHEDULING DATA TRANSMISSIONS BETWEEN A MOBILE TERMINAL AND A BASE STATION IN A WIRELESS COMMUNICATIONS NETWORK

CROSS-REFERENCE TO RELATED APPLICATIONS

This application is the National Stage of International App. No. PCT/EP2010/057714, filed Jun. 2, 2010, which claims priority under 35 U.S.C. §119(e) to U.S. Prov. App. No. 61/187,732, filed Jun. 17, 2009, all of which are entitled "SCHEDULING DATA TRANSMISSIONS BETWEEN A MOBILE TERMINAL AND A BASE STATION IN A WIRELESS COMMUNICATIONS NETWORK," and all of which are hereby incorporated by reference as if fully set forth herein.

TECHNICAL FIELD

The invention relates to methods and devices for scheduling data transmissions between a mobile terminal and a base station in a wireless communications network arranged for the transmission of multiple independently scheduled component carrier signals.

BACKGROUND

With each generation, wireless communication systems are characterized by ever-higher data rates. While some increase in data rates may be attributed to improvements in modulation, coding, and the like, significant increases in data rates generally require higher system bandwidths. For example, the International Mobile Telecommunications, IMT, advanced (a proposed fourth generation (4G) wireless communication system), mentions bandwidths up to 100 MHz. However, the radio spectrum is a limited resource, and since many operators and systems compete for limited radio resources, it is unlikely that 100 MHz of contiguous spectrum will be free for such systems.

One approach to increasing bandwidth requirements in limited, fragmented spectrum is to aggregate non-contiguous spectrum. From a baseband point of view, this can effectively increase the system bandwidth sufficiently to support up to 1 Gb/s, a throughput requirement for 4G systems. Transmitting data in non-contiguous parts of the spectrum also introduces flexibility, as spectrum utilization may be adapted to existing spectrum use and geographical position. Additionally, different modulation and coding schemes may be advantageously applied to different portions of the spectrum.

A possible evolution of current cellular systems, such as the 3GPP Long Term Evolution (LTE), to support non-contiguous spectrum is to introduce multiple component carriers or multiple channels. In such a multi-channel or multiple component carrier system, each separate portion of spectrum may be considered an LTE system. Multi-channel transmission is likely to be a principal part of the further releases of 3G LTE targeting ITU IMT-Advanced capabilities. A mobile terminal for use in such a system will be capable of receiving multiple component carriers, of different bandwidths, and transmitted at different carrier frequencies. Also High-Speed Packet Access (HSPA) systems can use multiple bands, e.g. dual carrier (downlink) and dual cell (uplink). In the following, the general term "multiple system carrier" is used.

US 2007/007090 discloses a multi-carrier communication system in which radio resources are distributed between a plurality of access terminals. The carriers assigned to an access terminal are determined by the network based on scheduling information received from the access terminal. The scheduling information may include data requirements, Quality-of-Service requirements, available transmit power headroom, the location of the access terminal, or hardware constraints associated with the access terminal. This disclosure does not relate to the use of non-contiguous bandwidths.

The design of a mobile terminal supporting multiple non-contiguous system carriers is a non trivial task. The aggregated spectrum approach implies that the radio receiver architecture for such a mobile terminal will become more complicated than a terminal only capable to receive contiguous system bandwidths. One reason for this is that the front end radio needs to be able to suppress blocking signal in between the spectrum "chunks". Different kinds of radio architecture can be used for handling this problem; however, they typically have drawbacks compared to standard contiguous system receivers in terms of current consumption. Therefore there is a need for an efficient non-contiguous multi-carrier system design taking into account the challenges in the mobile terminal front end receiver design.

SUMMARY

Therefore, it is an object of embodiments of the invention to provide a flexible method of scheduling data transmissions, which is more efficient and takes the mobile terminal's current ability to handle non-contiguous system carriers into account.

According to embodiments of the invention the object is achieved by using a method of scheduling data transmissions between a mobile terminal and a base station in a wireless communications network arranged for the transmission of multiple system carrier signals, each system carrier providing for the transmission of signals in a predetermined bandwidth around the carrier.

The method may comprise the steps of receiving in the mobile terminal information from said base station indicating available system carriers; detecting in the mobile terminal at least one dynamic parameter indicative of the mobile terminal's current capability to handle non-contiguous system carriers; determining in the mobile terminal from said at least one dynamic parameter whether a situation has occurred in which the mobile terminal's capability to handle non-contiguous system carriers has been reduced; modifying, if such a situation has occurred, feedback information to be transmitted to said base station; and transmitting the modified feedback information from said mobile terminal to said base station.

By modifying the feedback information in this way the mobile terminal reduces the likelihood that the base station allocates non-contiguous system carriers to the mobile terminal in the situations where the mobile terminal has a reduced capability of handling such system carriers.

In some embodiments the system carrier signals may be transmitted in a Third Generation Long Term Evolution system or in a High-Speed Packet Access system.

In one embodiment the method further comprises the step of selecting the at least one parameter from the group of parameters consisting of a parameter indicative of a charging level of a battery in the mobile terminal, a parameter indicative of a level of transmission power from the mobile terminal required to achieve a predetermined quality level of data transfer from the mobile terminal and a parameter indicative of a level of base band processing capability in the mobile terminal.

By letting the mobile terminal control the number of system carrier to use in respect to a parameter indicative of a charging level of a battery in the mobile terminal, a longer battery lifetime may be achieved. This may be done by limiting the use of multiple component carriers when the battery charging level is low, thereby saving the power needed to support multiple component carriers. Additionally a simpler design of the mobile terminal may be used since there is no need for supporting multiple system carriers at a low battery voltage.

By letting the parameter be indicative of a level of transmission power from the mobile terminal, to achieve a predetermined quality level of data transfer, a simpler design of the mobile terminal may be used, since the mobile terminal does not have to support multiple system carriers when transmitting with a high power. This may be achieved by limiting the number of system carriers used when transmitting with a high power.

By letting the parameter be indicative of a level of base band processing capability in the mobile terminal a more efficient use of the processing resources in the mobile terminal may be achieved. This may be done by limiting the number of system carriers used when the processing resources in the mobile terminal is scarce.

In one embodiment the method further comprises the steps of detecting the occurrence of a system carrier event triggered by one of the parameter levels passing a predefined threshold; and performing the step of determining whether a situation with reduced capability to handle non-contiguous system carriers has occurred when a system carrier event is detected.

By controlling the use of multiple system carriers in respect to an event triggered by the passing of a predetermined threshold by one of the parameter levels, an easy implementation of the method in a mobile terminal is made possible.

In one embodiment the step of modifying feedback information comprises reporting a Channel-Quality Indicator for at least one received system carrier indicating a signal quality level that is lower than an actually received signal quality. This reduces the likelihood of receiving downlink data on multiple component carriers.

In one embodiment the step of modifying feedback information comprises reducing a scheduling request size indicating an amount of data to be transmitted to said base station. This increases the likelihood for only being uplink scheduled on one component carrier or fewer component carriers.

In one embodiment the step of modifying feedback information comprises reducing a level of transmitted channel-sounding reference signals for at least one uplink system carrier. This reduces the likelihood for scheduling allocation on multiple uplink component carriers.

Some embodiments of the invention relate to a mobile terminal configured to schedule data transmissions between the mobile terminal and a base station in a wireless communications network arranged for the transmission of multiple system carrier signals, each system carrier providing for the transmission of signals in a predetermined bandwidth around the carrier. The mobile terminal is configured to receive information from said base station indicating available system carriers; detect at least one dynamic parameter indicative of the mobile terminal's current capability to handle non-contiguous system carriers; determine from said at least one dynamic parameter whether a situation has occurred in which the mobile terminal's capability to handle non-contiguous system carriers has been reduced; modify, if such a situation has occurred, feedback information to be transmitted to said base station; and transmit the modified feedback information to said base station.

Embodiments corresponding to those mentioned above for the method also apply for the mobile terminal.

Some embodiments of the invention relate to a computer program and a computer readable medium with program code means for performing the method described above.

BRIEF DESCRIPTION OF THE DRAWINGS

Embodiments of the invention will now be described more fully below with reference to the drawings, in which.

DETAILED DESCRIPTION OF EMBODIMENTS

Figure 1:
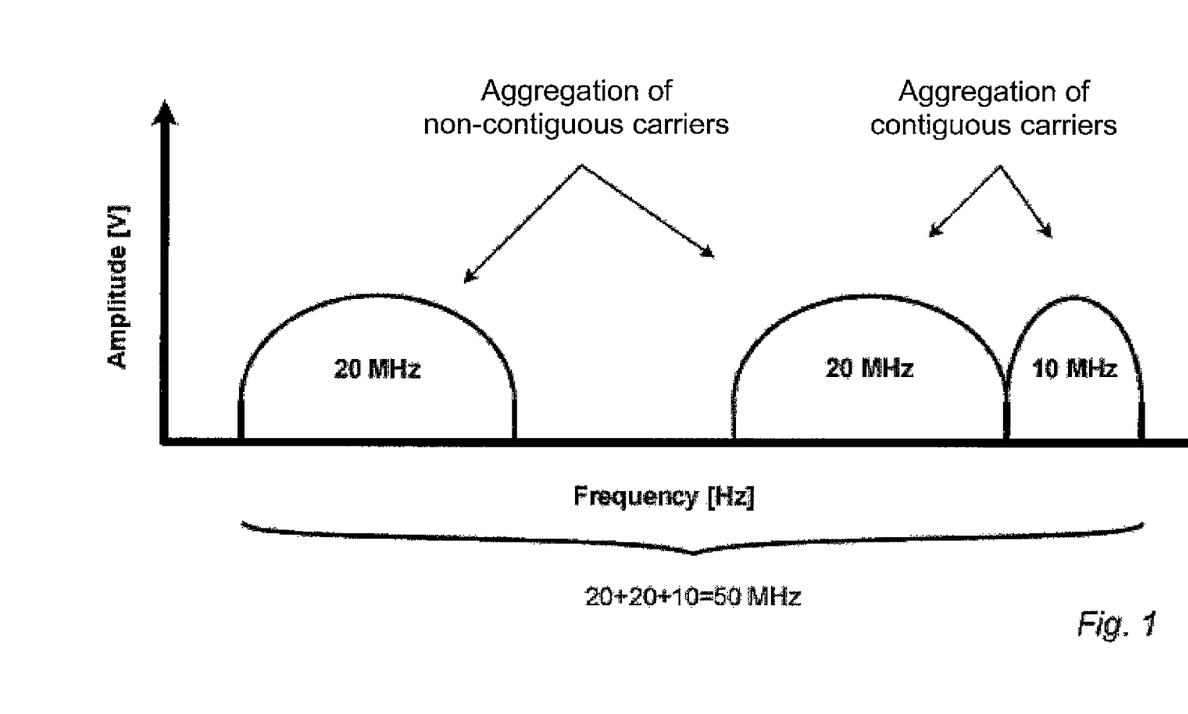
FIG. 1 is a frequency plot showing multiple component carriers.

In order to achieve higher bandwidths, e.g. up to 100 MHz, in wireless communications networks non-contiguous spectrum can be aggregated. FIG. 1 depicts an example of aggregation of system carriers to achieve greater bandwidth. It may be noted that the left-most system carrier is well spaced-apart in frequency to the other system carriers. It will experience, and cause, only a small amount of Inter carrier interference due to the wide carrier spacing. However, the two right most system carriers are not as well spaced apart in frequency.

In a spectrum aggregated or multi-channel system as is discussed herein, several frequency bands, contiguous or non-contiguous, may be allocated for the communication with one mobile terminal. The modulation and access format within the band could be of any kind, e.g., orthogonal frequency division multiplexing (OFDM), single-carrier frequency division multiplexing (SC-FDMA), code-division multiple access (CDMA) etc. In this application, we denote such a system "multiple component carrier system" or "multiple system carrier system". In this context, one channel is referred to as one "component carrier" or one "system carrier". It may also be noted that this type of system in some publications is called "multi-carrier", however, the term component carrier or system carrier is used here to avoid confusion with OFDM sub-carriers.

In the following, a Third Generation Long Term Evolution (3G LTE) system is used as an example for explaining the invention. However, it is noted that the invention is not limited to such a system, but can be used as well in other systems. One example of another system, where the invention can be used, is a High-Speed Packet Access (HSPA) system, in which dual-carrier can be used in the downlink and dual-cell can be used in the uplink. In a new release HSPA will be extended to 4 carrier or 4 cell HSPA.

Thus a system carrier can be a 3G LTE component carrier or a HSPA dual carrier. It is noted that a non dual-cell HSPA (i.e. single HSPA carrier) capable terminal is capable to connect on such a system (HSPA) carrier, and that a non component carrier LTE (i.e. single carrier LTE) terminal is capable to connect on such a system (LTE) carrier.

Since 3G LTE uses the term "component carrier" this term is used in the following description for convenience instead of the more general term "system carrier".

This invention describes methods and devices for handling problems with multi-component carrier support in case of some kind of overload situation. For instance, depending on the battery status, the needed transmit power, real-time processing problem etc, there can be situations where the mobile terminal could not support multi-component carrier according to it's mobile terminal capability. In uplink it could e.g. be hard to fulfil spectrum leakage requirements, while in downlink it can be hard to fulfil blocking requirements. Different kind of radio architecture can be used for handling this problem, but they typically have drawbacks compared to standard continuous system bandwidth receivers in terms of current consumption.

Figure 2A:
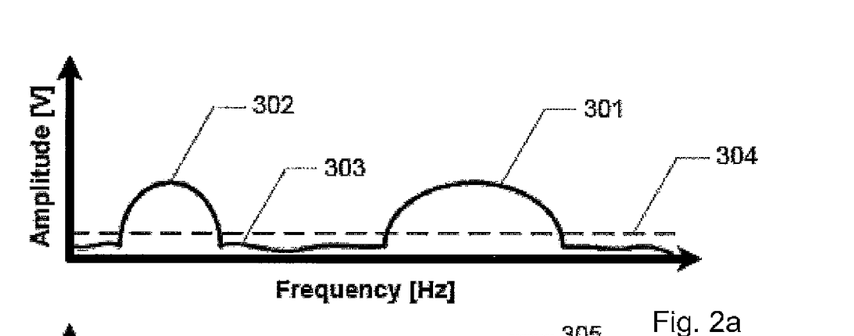
FIG. 2a is a frequency plot showing the spectrum leakage when transmitting multiple component carriers with low power.
Figure 2B:
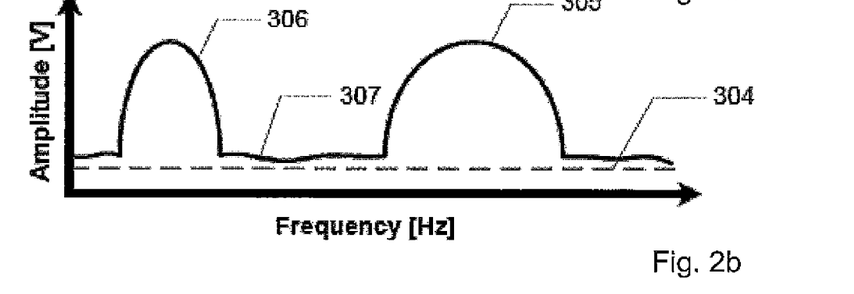
FIG. 2b is a frequency plot showing the spectrum leakage when transmitting multiple component carriers with high power.

FIGS. 2a and 2b illustrate a situation with uplink transmission from a mobile terminal on multiple component carriers.

FIG. 2a shows frequency leakage when transmitting with relatively low power from a mobile terminal to a base station. The transmit power level is typically chosen based on a predetermined quality level requirement. Closed power loops are commonly used to adjust the transmit power. The loops function by monitoring, in the base station, the quality level of the transmission. If the quality level drops below a predetermined threshold, a control signal is sent from the base station to the mobile terminal, which in return increases the transmit power. Reversely, If the quality rises above a predetermined threshold, the base station signals to the mobile terminal which then decreases the transmit power.

Two component carriers 301, 302 are shown. Nonlinearities in the transmitter and RF power amplifier result in intermodulation distortion, this leads to frequency leakage. To enable other users to use the bandwidth positioned outside the bandwidths of the used component carriers, strict frequency leakage requirements apply on mobile terminals. 303 shows the frequency leakage of the two component carriers 301, 302, and 304 shows the leakage requirement of the mobile network. The frequency leakage 303 of the two component carriers 301, 302 is below the leakage requirement 304 when the transmit power of the carriers is low.

FIG. 2b shows frequency leakage when transmitting with a higher power from the mobile terminal to a base station. Again, two non-contiguous component carriers 305,306 are shown. They are positioned at the same frequencies as the two component carriers 301,302 in FIG. 2a, however due to the increased transmit power their amplitude is higher. The spectrum leakage 307 of the two carriers is now above the spectrum leakage requirement of the mobile network. Using a more linear transmitter and RF power amplifier is a possible way to mitigate this. However, highly linear components generally consume more power and increase the complexity and cost of the mobile terminal.

Thus it can be advantageous to control the number of component carriers based on the needed transmit power of the individual carriers. One way of doing this is to decrease the number of component carriers used, when the transmit power is high, i.e. above a predefined threshold. Alternatively, use of component carriers with a narrow bandwidth may be limited, when transmitting with high power. This will enable multicarrier support on mobile terminals without the need of costly hardware and with reasonable power consumption.

Similarly, it can be advantageous to control the number of component carriers based on the state of charge of the battery in the mobile terminal. This may be done by decreasing the number of component carriers used, when the state of charge of the battery is low, thereby achieving both multi carrier support and a long battery life time, without the need of a complex and expensive architecture in the mobile terminal.

The number of component carriers used may also be controlled by a power management system functioning as a dynamic parameter. The power management system may function by estimating the power consumption of supporting multiple component carriers and determine the number of carriers to use in relation to the estimated power consumption. This may be done by limiting the number of component carriers used when the power consumption for supporting multiple component carriers is high. The state of charge of the battery in the mobile terminal may also be used as an input to the power management system. By using a power management system a longer battery life time is achieved. Thereby multiple component carriers may be supported only in situations where the power consumption for supporting them is relative low.

FIGS. 3a, 3b, 4a and 4b illustrate a situation with downlink transmission to a mobile terminal on multiple component carriers.

Figure 3A:
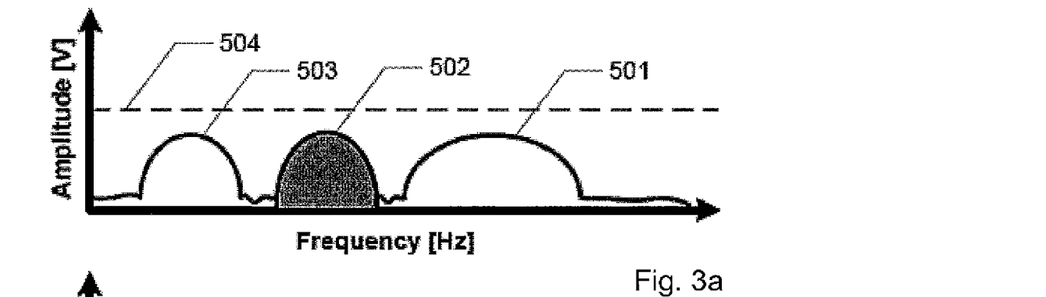
FIG. 3a is a frequency plot showing the amplitude of a low energy interference signal positioned between two component carriers prior to filtration.
Figure 3B:
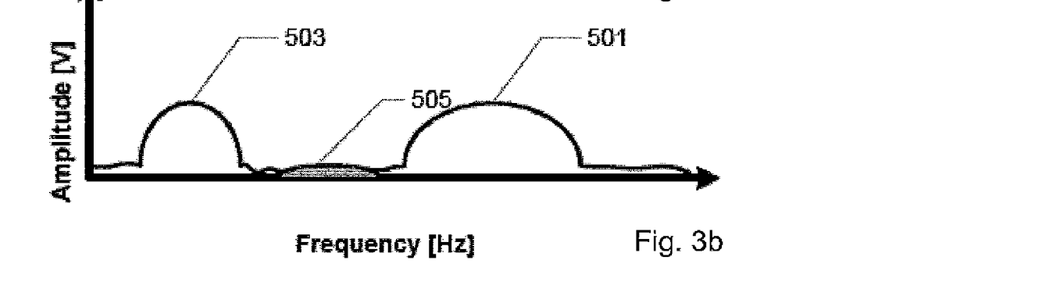
FIG. 3b is a frequency plot showing the amplitude of a low energy interference signal positioned between two component carriers after filtration.

FIG. 3a shows a frequency plot of an interference signal 502 with relatively low energy positioned between two component carriers 501,502 prior to filtration in a mobile terminal. 504 is a threshold showing the ability of the filters in the mobile terminal to block out interference signals. The threshold is determined by the quality of the filters in the mobile terminal. The interference signal 502 has an amplitude that is lower than the threshold 504. FIG. 3b shows a frequency plot of the same situation as depicted in FIG. 3a, after filtration in the mobile terminal. The power of the interference signal has been minimized to an insignificant level, and a good quality of service is achieved for the two component carriers 501,502.

Figure 4A:
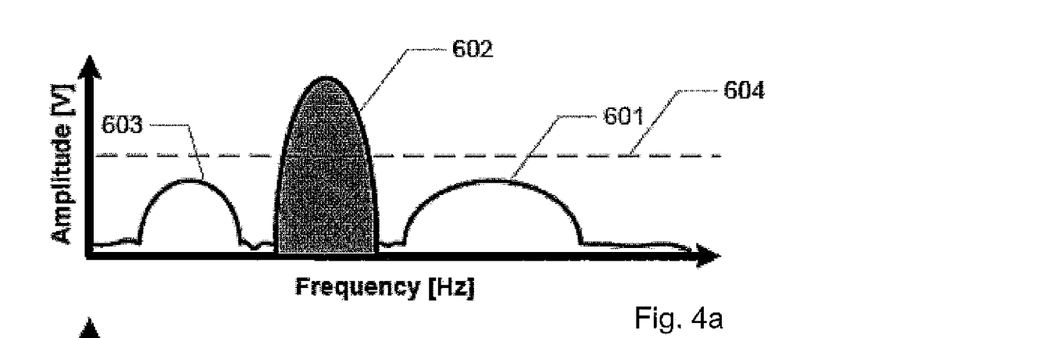
FIG. 4a is a frequency plot showing the amplitude of a high energy interference signal positioned between two component carriers prior to filtration.
Figure 4B:
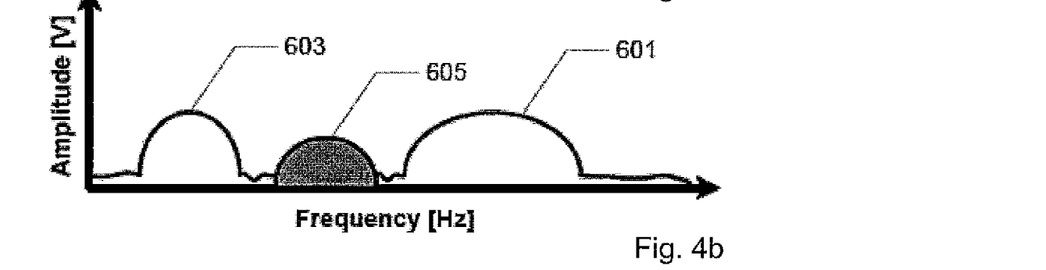
FIG. 4b is a frequency plot showing the amplitude of a high energy interference signal positioned between two component carriers after filtration.

FIG. 4a shows a frequency plot of an interference signal 602 with a higher energy positioned between the two component carriers 601,602 prior to filtration in a mobile terminal. 604 is a threshold showing the ability of the filters in the mobile terminal to block out interference signals. The amplitude of the interference is in this situation higher than the threshold 604. FIG. 4b shows a frequency plot of the same situation as depicted in FIG. 4a after filtration in the mobile terminal. The power of the interference signal has been lowered, but it remains relatively high compared to the amplitude of the two component carriers 601,602 resulting in a poor quality of service of the carriers. This can be corrected by using high performance filters with a higher threshold; however this will again both increase the total power consumption and increase the overall cost of the device.

Thus it can be advantageous to control the number of used component carriers based on the power of interference signals. This may be achieved by limiting the use of multi carrier components when high energy interference signals are present, thereby achieving good multi carrier support in the most common case, when no high energy interference signals are present, without the need of costly hardware to cope high energy interference signals.

Mobile terminals have transformed from being simple communication tools into being a fully operational transportable computer system, providing a range of different applications such as audio and movie applications, maps, dictionaries and games. This evolution has increased the need for processing power in mobile terminals. Multi carrier component support further increases the overall processing load of the mobile terminal.

Therefore, complicated applications might be processed slower when multi carrier components are used, resulting in a decreased user experience. Thus it can be advantageous to control the number of component carriers used in relation to the processing load of the mobile terminal. This can be achieved by using fewer component carriers when processing complicated applications, thereby securing a faster processing of complex application and an increased user experience.

Figure 5:
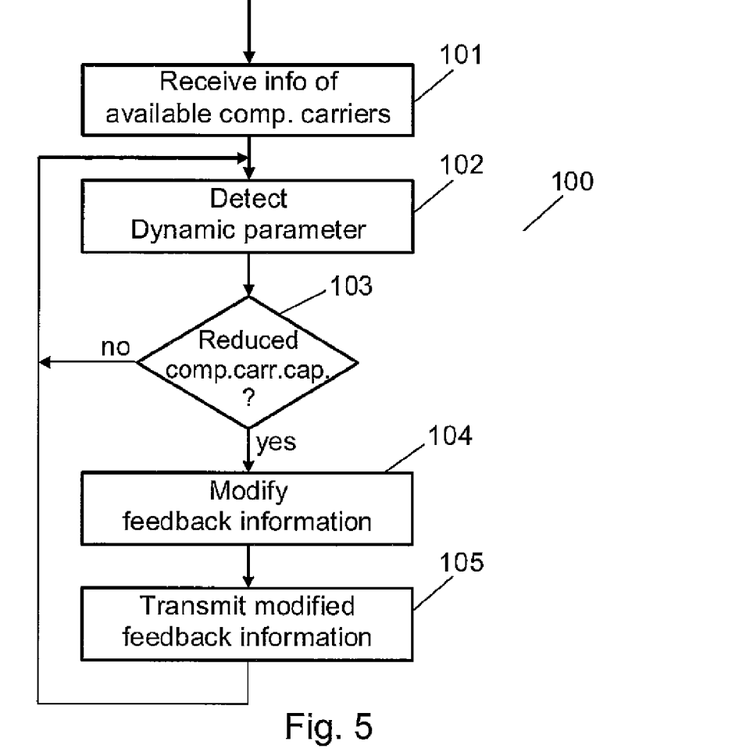
FIG. 5 is a flow chart of a method of scheduling data transmissions between a mobile terminal and a base station.

FIG. 5 shows a flow chart of an embodiment of the present invention. In step 101 the mobile terminal is connected to a multi component carrier network node. This may be achieved by using a cell search procedure. The mobile terminal then receives information related to the available component carrier possibilities of the multi component carrier cell. This information may include information related to the bandwidth and carrier frequencies of the component carriers. The number of available component carriers may be any number, including the special case when only a single component carrier is available. The mobile terminal then determines a subset of the available component carriers to use for transmitting and receiving data from and to the multi component carrier cell, i.e. the mobile terminal's capability to handle multiple component carriers, including its capability to handle non-contiguous component carriers, and it informs the multi component carrier cell about this capability, typically via standard Radio Resource Control (RRC) signaling. The choice may be based on the physical resources of the mobile terminal. The subset does not have to be a proper subset, meaning that the chosen subset may include all the possible component carriers received from the multi-carrier cell.

Next, in step 102 the mobile terminal monitors dynamic parameters indicative of its current capability to handle non-contiguous component carriers, and from the detected parameters it is determined in step 103 whether a situation has occurred in which the mobile terminal's capability to handle non-contiguous component carriers has been reduced, i.e. whether a component carrier support event has occurred. As described above, such events or situations may relate to parameters such as the battery level of the mobile terminal, the transmit power of the mobile terminal, the processing load of the mobile terminal, energy of interference signals, or data transfer requirements of applications on the mobile terminal. For instance, in case of low battery or high needed transmit power it could be difficult for the mobile terminal to support multi-component carrier transmission in uplink and/or downlink. In uplink it could e.g. be hard to fulfil spectrum leakage requirements, while in downlink it could e.g. be hard to fulfil blocking requirements. Another example could be some kind of overload in the real time processing in the baseband, making a large downlink reception over multiple component carriers risky in terms of risk for timing mismatch, which then in the end might give rise to a dropped connection.

The occurrence of a component carrier event is typically triggered by the level of one of the dynamic parameters passing a predefined threshold. However, it is noted that there may well be more than one threshold for a given parameter so that the capability of handling non-contiguous component carriers can be reduced in steps. Similarly, a component carrier event may also be triggered by a combination of parameters passing their individual predefined thresholds. The combination may be any combination of the following parameters: the battery level of the mobile terminal, the transmit power of the mobile terminal, the processing load of the mobile terminal, energy of interference signals, or data transfer requirements of application on the mobile terminal. E.g. a component carrier event may be triggered by a combination of low battery level and high needed transmit power.

If an event is triggered, i.e. a situation with reduced capability to handle non-contiguous component carriers has occurred, then the mobile terminal tries to reduce the likelihood for reception and/or transmission on multiple component carriers in order to still maintain the connection to the network node, i.e. not to drop the connection. This is done in step 104 by modifying or restricting feedback information transmitted to the network node about the signal quality on at least one of uplink and downlink component carriers and/or restricting the scheduling allocation needed (information transmitted to the network node) for either uplink or downlink.

One way of doing this is to restrict the Channel-Quality Indicator (CQI) on a subset of the downlink component carriers, i.e. the terminal can start to report very low signal quality (i.e. a signal quality level that is lower than the actually received signal quality) on a subset of the component carriers, then reducing the likelihood of receiving data on these multiple component carriers.

As another example, to reduce the multiple uplink component carriers, the mobile terminal can introduce a restriction in the requested uplink allocation, i.e. the mobile terminal can reduce the scheduling request size (by introducing constraints in the buffer status), so that the likelihood that the network node gives allocation over many uplink component carriers is reduced.

Another example of uplink restrictions can be used in case sounding reference signals are transmitted in the uplink. Sounding reference signals or symbols are used by the network node to determine where to allocate uplink "chunks"/component carriers to a certain mobile terminal. The mobile terminal can bias the uplink sounding reference symbols on a subset of the component carriers to reduce the likelihood for scheduling allocation on multiple component carriers. The biasing could be implemented such that the transmitted reference symbols on some component carriers are transmitted with less gain, digitally adjusted in the signal generation part.

The modified feedback information from step 104 is then transmitted from the mobile terminal to the base station in step 105.

The mobile terminal may stay in this "restricted feedback mode" until a normal component carrier state is determined. For instance, the required transmit power becomes lower (than a threshold), the battery level comes back to a normal value, or the baseband processing is in synchronization again. Then the restriction of the feedback information is removed and the Channel-Quality Indicator reports etc goes back to normal mode again.

Figure 6:
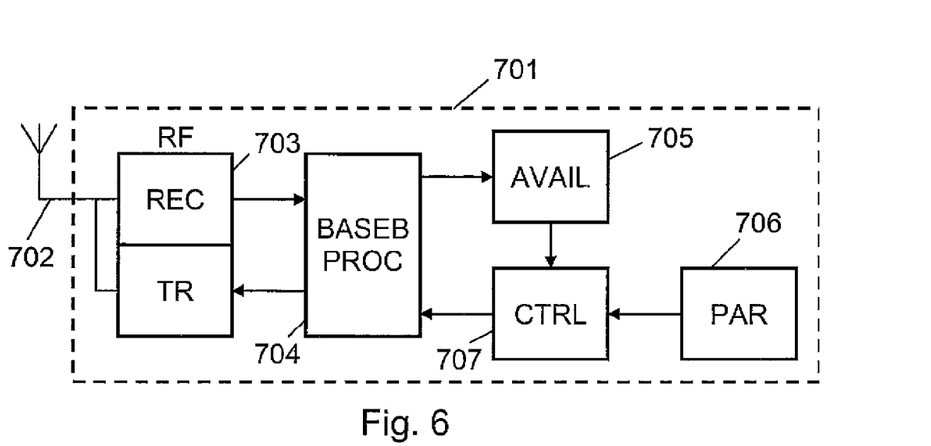
FIG. 6 is a functional block diagram of a mobile terminal.

FIG. 6 shows a functional block diagram of a mobile terminal 701 configured to schedule data transmissions between the mobile terminal and a base station in a wireless communications network using the principles of the present invention. The mobile terminal comprises an antenna 702 for communicating with the base station using radio frequency signals. The radio frequency signals from the antenna is received in the radio frequency block 703, which has a reception part and a transmission part, and then processed in the baseband processing block 704. Information from the base station indicating available component carriers is then determined and stored in the available component carriers unit 705. In block 706 the mobile terminal detects at least one dynamic parameter indicative of the mobile terminal's current ability to handle non-contiguous component carriers. The parameters are described above.

The control block 707 determines from the at least one dynamic parameter whether a situation has occurred in which the mobile terminal's capability to handle non-contiguous component carriers has been reduced. As mentioned above, this is typically done by comparing the parameter value with a predetermined threshold. If it is determined that such a situation has occurred, the control block 707 modifies feedback information to the base station, and the modified information is then transmitted to the base station through the baseband processing block 704 and the transmitter part of the radio frequency block 703.

Although various embodiments of the present invention have been described and shown, the invention is not restricted thereto, but may also be embodied in other ways within the scope of the subject-matter defined in the following claims.

What is claimed is:

1. A method of scheduling data transmissions between a mobile terminal and a base station in a wireless communications network arranged for the transmission of multiple system carrier signals, each system carrier providing for the transmission of signals in a predetermined frequency band around the carrier, the mobile terminal configured to receive information from the base station indicating available system carriers, the method comprising:
   detecting in the mobile terminal at least one dynamic parameter indicative of the mobile terminal's current capability to handle non-contiguous system carriers;
   determining in the mobile terminal from said at least one dynamic parameter whether a situation has occurred in which the mobile terminal's capability to handle non-contiguous system carriers has been reduced;
   modifying, if such a situation has occurred, feedback information to be transmitted to said base station to a level that is lower than an actual level of said feedback information; and
   transmitting the modified feedback information from said mobile terminal to said base station.

2. The method according to claim 1, further comprising transmitting said system carrier signals is a Third Generation Long Term Evolution system or in a High-Speed Packet Access system.

3. The method according to claim 1, further comprising selecting said at least one parameter from the group of parameters consisting of:
   a parameter indicative of a charging level of a battery in the mobile terminal;
   a parameter indicative of a level of transmission power from the mobile terminal required to achieve a predetermined quality level of data transfer from the mobile terminal; and
   a parameter indicative of a level of base band processing capability in the mobile terminal.

4. The method according to claim 3, further comprising:
   detecting the occurrence of a system carrier event triggered by one of said parameter levels passing a predefined threshold; and
   determining whether a situation with reduced capability to handle system carriers having non-contiguous frequency bands has occurred when the system carrier event is detected.

5. The method according to claim 1, wherein modifying the feedback information comprises reporting a Channel-Quality Indicator for at least one received system carrier indicating a signal quality level that is lower than an actually received signal quality.

6. The method according to claim 1, wherein modifying the feedback information comprises reducing a scheduling request size indicating an amount of data to be transmitted to said base station.

7. The method according to claim 1, wherein modifying the feedback information comprises reducing a level of transmitted channel-sounding reference signals for at least one uplink system carrier.

8. A mobile terminal configured to schedule data transmissions between the mobile terminal and a base station in a wireless communications network arranged for the transmission of multiple system carrier signals, each system carrier providing for the transmission of signals in a predetermined frequency band around the carrier, the mobile terminal being configured to receive information from said base station indicating available system carriers, the mobile terminal comprising a transceiver and a baseband processing circuit, wherein the baseband processing circuit configured to:
   detect at least one dynamic parameter indicative of the mobile terminal's current capability to handle non-contiguous system carriers;
   determine from said at least one dynamic parameter whether a situation has occurred in which the mobile terminal's capability to handle non-contiguous system carriers has been reduced;
   modify, if such a situation has occurred, feedback information to be transmitted to said base station to a level that is lower than an actual level of said feedback information; and
   transmit the modified feedback information to said base station.

9. The mobile terminal according to claim 8, wherein the mobile terminal is configured to be used in a Third Generation Long Term Evolution system or in a High-Speed Packet Access system.

10. The mobile terminal according to claim 8, wherein the mobile terminal is further configured to select said at least one parameter from the group of parameters consisting of:
    a parameter indicative of a charging level of a battery in the mobile terminal;
    a parameter indicative of a level of transmission power from the mobile terminal required to achieve a predetermined quality level of data transfer from the mobile terminal; and
    a parameter indicative of a level of base band processing capability in the mobile terminal.

11. The mobile terminal according to claim 10, wherein the mobile terminal is further configured to:
    detect the occurrence of a system carrier event triggered by one of said parameter levels passing a predefined threshold; and
    determine whether a situation with reduced capability to handle non-contiguous system carriers has occurred when a system carrier event is detected.

12. The mobile terminal according to claim 8, wherein the mobile terminal is configured to modify feedback information by reporting a Channel-Quality Indicator for at least one received system carrier indicating a signal quality level that is lower than an actually received signal quality.

13. The mobile terminal according to claim 8, wherein the mobile terminal is configured to modify feedback information by reducing a scheduling request size indicating an amount of data to be transmitted to said base station.

14. The mobile terminal according to claim 8, wherein the mobile terminal is configured to modify feedback information by reducing a level of transmitted channel-sounding reference signals for at least one uplink system carrier.

15. A computer program product stored on a non-transitory computer readable medium to schedule data transmissions between a mobile terminal and a base station in a wireless communications network arranged for the transmission of multiple system carrier signals, each system carrier providing for the transmission of signals in a predetermined frequency band around the carrier, the mobile terminal configured to receive information from the base station indicating available system carriers, the computer program product comprising computer program instructions that, when executed, cause the performance of:

detecting in the mobile terminal at least one dynamic parameter indicative of the mobile terminal's current capability to handle non-contiguous system carriers;

determining in the mobile terminal from said at least one dynamic parameter whether a situation has occurred in which the mobile terminal's capability to handle non-contiguous system carriers has been reduced;

modifying, if such a situation has occurred, feedback information to be transmitted to said base station to a level that is lower than an actual level of said feedback information; and     transmitting the modified feedback information from said mobile terminal to said base station.

\* \* \* \* \*